United States Patent [19]

Honderich

[11] Patent Number: 4,794,991

[45] Date of Patent: Jan. 3, 1989

[54] APPARATUS FOR THE TREATMENT OF LAMINITIS

[76] Inventor: James P. Honderich, 2988 Ribbon Ct., Ft. Meyers, Fla. 33905

[21] Appl. No.: 946,317

[22] Filed: Dec. 24, 1986

Related U.S. Application Data

[63] Continuation of Ser. No. 738,988, May 29, 1985, abandoned.

[51] Int. Cl.$^4$ ................................................ A01L 5/00
[52] U.S. Cl. .......................................... 168/26; 168/28
[58] Field of Search ........................ 168/10, 12, 14, 26, 168/28

[56] References Cited

U.S. PATENT DOCUMENTS

| | | | |
|---|---|---|---|
| 415,003 | 11/1889 | Starkweather | 168/28 |
| 757,473 | 4/1904 | Lemon | 168/26 |
| 1,612,577 | 12/1926 | Hall | 168/28 |
| 4,565,250 | 1/1986 | Vasko | 168/28 X |

Primary Examiner—Robert P. Swiatek
Attorney, Agent, or Firm—Philip R. Wadsworth

[57] ABSTRACT

An apparatus for the treatment of laminitis in a horse, comprising in the preferred embodiment a plate member sized, shaped and adapted for fastening to the hoof of the horse, the plate member including a concave upwardly projecting portion for rotating an out of position coffin bone of the horse into its normal position and maintaining the coffin bone in the normal position for healing. The apparatus further comprises a U-shaped support member extending from the top of the upwardly projecting portion, for providing additional support and positioning of the coffin bone of the horse, a cushioning member, positioned on top of the plate member and the support member, for cushioning the bottom of the foot of the horse; and a bonding layer of hardened rubber for fastening the support member and the cushioning member to the plate member, the U-shaped support member being an integral portion of the bonding layer.

17 Claims, 2 Drawing Sheets

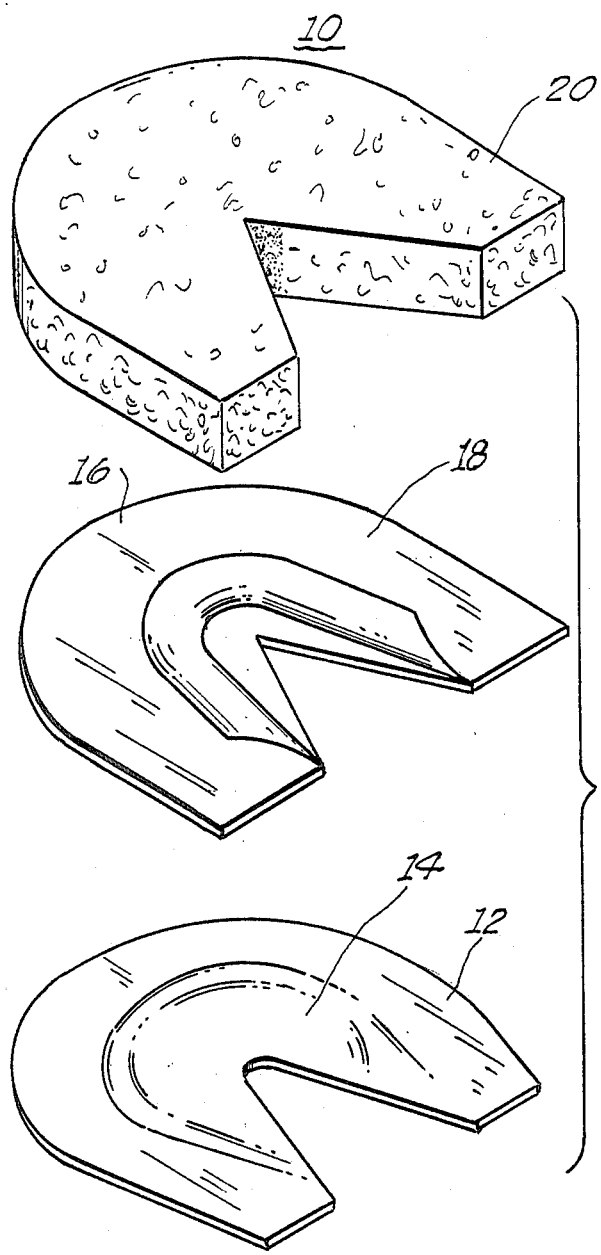
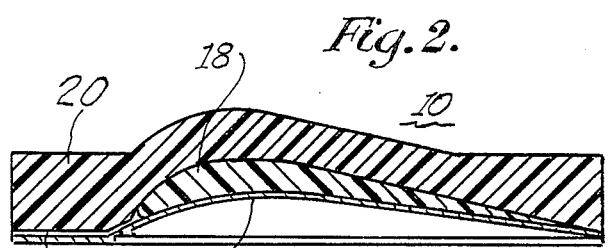
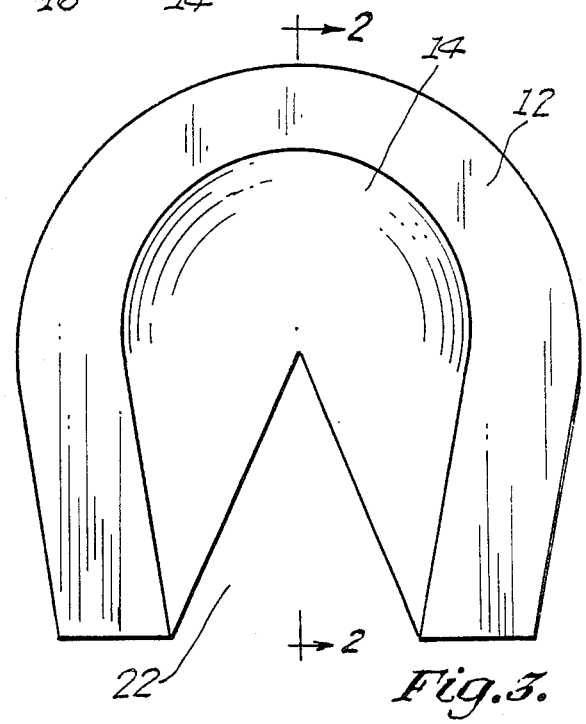
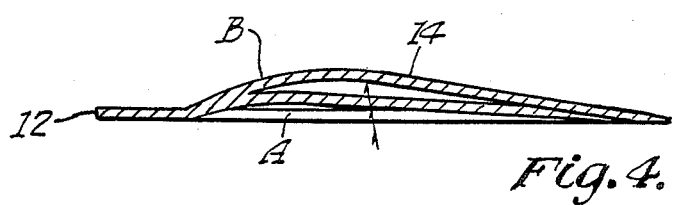
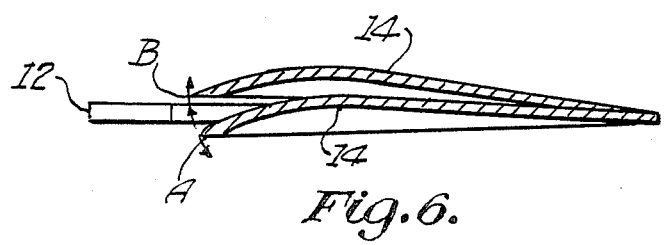
Fig.1.
Fig.2.
Fig.3.
Fig.4.
Fig.6.

APPARATUS FOR THE TREATMENT OF LAMINITIS

This application is a continuation of application Ser. No. 738,988 filed on May 29, 1985, and now abandoned.

BACKGROUND OF THE INVENTION

The present invention relates to devices for treating laminitis in horses, and more particularly to an apparatus which is placed between a horse's hoof and a horseshoe to properly reposition the rotated out of position coffin bone of a horse afflicted with laminitis, and allows rebonding of the insensitive laminae to the sensitive laminae and the eventual healing thereof.

Other devices have been utilized to attempt to cure laminitis in horses. One such device is illustrated in U.S. Pat. No. 4,222,509 to Mercer II for a Prosthetic Horseshoe, which issued on Dec. 27, 1983. FIGS. 1 and 2 of Mercer provide a good illustration of the position of a horse's coffin bone before and after the horse becomes afflicted with laminitis, respectively. The Mercer II invention provides a horseshoe with a cross member 14 having an adjustable pin therethrough which is designed to rotate the coffin bone back to its normal position and hold it there during treatment. However, the use of the Mercer II invention would require frequent adjustment of the pin to compensate for hoof growth during the treatment period.

SUMMARY OF THE INVENTION

Accordingly, one object of the present invention is to provide a novel apparatus for testing laminitis in a horse.

It is still another object of the present invention to provide a novel apparatus which repositions a rotated out of position coffin bone of a horse afflicted with laminitis into the proper position to allow reattachment of the insensitive laminae to the sensitive laminae and the attendant healing thereof.

It is yet another object of the present invention to provide a novel apparatus for mechanically rotating and maintaining the rotated out of position coffin bone of a horse afflicted with laminitis into the normal position in the foot without penetrating the sole of the horse.

Another object of the present invention is to provide a novel apparatus for treating laminitis in a horse which automatically compensates for the growth of the horse's hoof, thus eliminating the need for frequent manual adjustment thereof.

The above and other objects of the present invention are provided by the novel apparatus which comprises in the preferred embodiment a plate member having an upwardly projecting cupped portion for mechanically rotating the rotated out of position coffin bone into the normal position, a bonding layer of rubber including a U-shaped coffin bone rotator and support member for further positioning of the coffin bone, the rotator and support member being positioned on the cupped portion of the plate member; the bonding layer for bonding the plate member to a cushioning member positioned over the rotator and support member and the plate member. The plate member is generally sized and shaped to fit between the horse's hoof and a horseshoe which when attached holds the apparatus in place.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an exploded perspective view of the present invention;

FIG. 2 is an unexploded cross-sectional view of the invention as illustrated in FIG. 1 taken across the line I—I;

FIG. 3 is a plan view of one embodiment of the plate member of FIG. 1;

FIG. 4 is a cross-sectional view of the plate member of FIG. 3 taken across the line II—II;

FIG. 6 is a cross-sectional view of the plate member of FIG. 5 taken across the line III—III;

DESCRIPTION OF THE PREFERRED EMBODIMENTS

Figure 8:
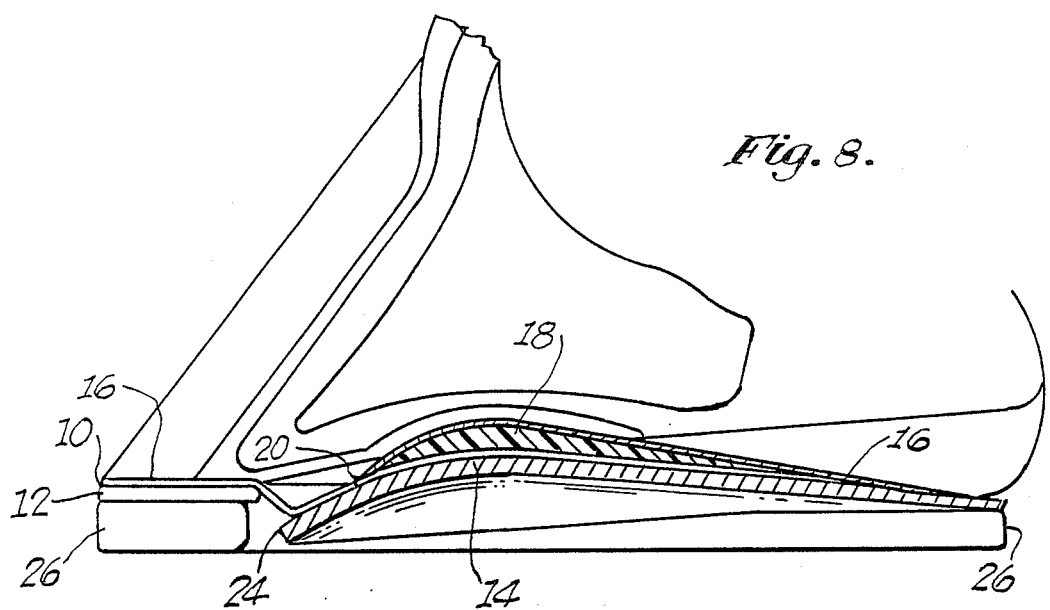
FIG. 8 is a schematic drawing showing the present invention attached to the front foot of a horse with the coffin bone rotated into the normal position.

Referring now to the drawings, wherein like reference numerals designate identical or corresponding parts throughout the several views, and more particularly to FIG. 1 thereof, an exploded perspective view of the present invention is illustrated.

However, before discussing FIG. 1, it should be understood that when a horse becomes afflicted with laminitis, the sensitive laminae of the horse becomes inflammed and swollen and actually separates from the insensitive or horny laminae of the horse.

When this separation occurs, the sensitive laminae of the horse slips downwardly and thus correspondingly allows the coffin bone of the horse to rotate downwardly in a dorsal drift. The pointed portion of the coffin bone then may protrude into the sole of the horse, causing much discomfort and in some cases even disabling the horse.

Returning now to FIG. 1, the present invention 10 comprises a plate member 12 having a concave upwardly projecting cupped portion 14, a bonding layer 16 having a coffin bone rotator and support member 18, and a foam rubber cushioning member 20.

Referring now to FIG. 2, a cross-sectional view of the device 10 is illustrated. It can be seen that the coffin bone rotator and support member 18 portion of the bonding layer 16 is positioned on top of the cupped portion 14 of the plate member 12 and is used for further positioning of the coffin bone. The foam rubber cushioning member 20 covers the coffin bone rotator and support member 18, as well as the plate member 12 and is used to provide additional comfort for the horse. The rubber layer 16 is used primarily to bond the foam rubber cushioning member 20 to the plate member 12. It should be understood that in order to accomplish this bonding, the rubber bonding layer 16 is initially applied to the bottom of the cushion member 20, which also has the shape of the coffin bone rotator and support member 18 formed therein, in liquid or semi-liquid form and while still in such a state, the plate member 12 is pressed into place and held in such a position until the rubber layer 16 cools and hardens, bonding the foam rubber cushioning member 20 to the plate member 12.

It should be further understood, that the plate member 12 having the cupped portion 14 with the rotator and support member 18 formed thereon from the plate member material could be used without the additional elements to treat the afflicted horse and obtain satisfactory results, as long as the cupped portion 14 is shaped to prevent pressure along the anterior-posterior dorsal edge of the coffin bone.

Referring now to FIG. 3, a plan view of one embodiment of the plate member 12 is illustrated. The outer periphery of the plate member 12 is generally circular in shape and is designed to follow the general contour of a horse's hoof. A V-shaped section 22 is cut out of the plate member 12 which allows exposure of the frog portion of the horse's foot. This allows the normal ground pressure against the frog to stimulate blood circulation. The V-shaped section also provides for flexibility of the plate member 12 as the hoof grows such that manual adjustment of the apparatus 10 is not necessary. The cupped or raised portion 14 of the plate member 12 is designed to begin its upward contour in an area just to the inside of the inside edge of the horse's hoof. It should be understood that in this embodiment the thickness of the plate member 12 is such as to allow some malleability of the cupped portion 14. Thus, when the horse walks on ground, the ground produces an upward force on the cupped portion 14 which is transmitted to the coffin bone to provide additional support for maintaining the coffin bone of the horse in the proper position.

FIG. 4 illustrates the self adjusting feature of the plate member 12 as the hoof of the horse grows. The malleability of the plate and the V-shaped cutout allows the cupped portion 14 to flex from position A to position B as the horse's hoof grows.

Figure 5:
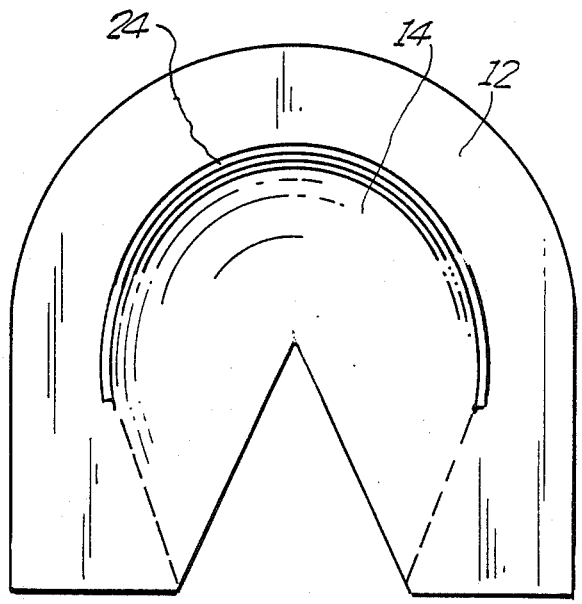
FIG. 5 is a plan view of another embodiment of the plate member of FIG. 1.

Referring now to FIG. 5, another embodiment of the plate member 12 is illustrated. This embodiment is designed for conditions when a thicker, more rigid plate is required for treatment of the horse afflicted with laminitis. Since the thicker member 12 is not as malleable as the plate member 12 of FIG. 3, a slot 24 must be made in the plate member 12 in the area of the plate member 12 where the cupped or raised portion 14 begins. The slot 24 extends for approximately 180 degrees around the front portion of the cupped or raised portion 14. The slot 24 enables the rigid cupped or raised portion 14 to move upwardly applying greater force to the coffin bone when the horse is standing on softer ground.

FIG. 6 illustrates the self adjusting feature of the cupped portion 14 of the plate of FIG. 5 as the horse's hoof grows. Since the plate member 12 in this embodiment is quite rigid, the addition of the slot 24 enables the cupped portion 14 of the plate member 12 to move from position A to position B without manual adjustment as the horse's hoof grows.

Figure 7:
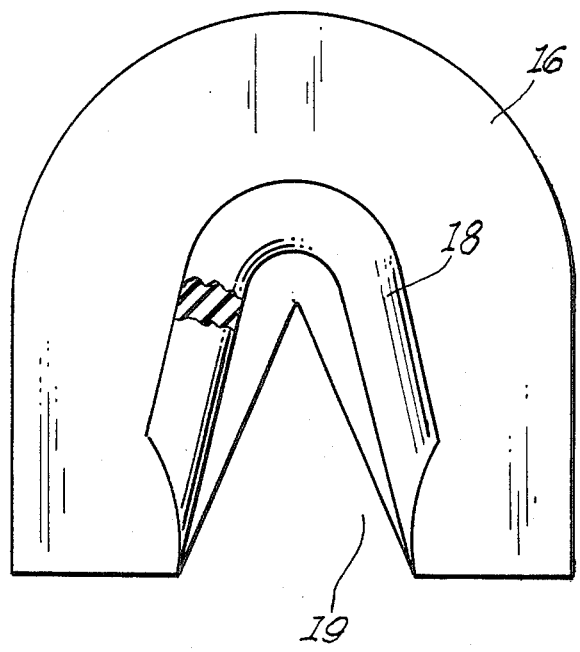
FIG. 7 is a plan view of the bonding layer of FIG. 1.

FIG. 7 is a plan view of the bonding layer 16 and illustrates the shape of the coffin bone rotator and support member 18.

Referring now to FIG. 8, a schematic drawing showing the present invention attached to the front foot of a horse with the coffin bone rotated into the normal position, using the plate member 12 of FIG. 5, is illustrated. As can be seen, the apparatus for treating laminitis 10 is placed between the horse's hoof and the horseshoe 26 prior to fixing the horseshoe to the horse's hoof. Once in place, the cupped or raised portion 14 of the plate member 12, as well as the coffin bone rotator and support member 18 force the coffin bone into its proper position for healing.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for the treatment of laminitis in a horse, comprising:
   a plate member sized, shaped and adapted for fastening to the hoof of a horse,
   said plate member including an upwardly projecting portion for rotating the out of position coffin bone of the horse into the normal position and maintaining the coffin bone in the normal position for healing; and
   support means, extending from the top of said upwardly projecting portion and being of sufficient thickness in the area substantially below the anterior-posterior dorsal edge of of the coffin bone to further position the coffin bone while minimizing the pressure being applied to the anterior-posterior dorsal edge of the coffin bone, said support means being substantially laterally immovable with respect to the horse's foot.

2. The apparatus, according to claim 1, further comprising:
   a cushioning means, positioned on top of said plate member and said support means, for cushioning the bottom of the foot of the horse.

3. The apparatus, according to claim 2, wherein said support means is integral with a bonding means, said bonding means for fastening said cushioning means to said plate member.

4. The apparatus, according to claim 3, further comprising:
   a V-shaped opening in the rear portion of said plate member for allowing said plate member to flex as the hoof of the horse grows whereby self adjustment of the plate member is realized and for allowing the frog portion of the foot of the horse to be exposed to normal ground pressure whereby stimulation of the frog promotes good blood circulation.

5. The apparatus, according to claim 3, wherein:
   said bonding means is comprised of a thin layer of solid rubber.

6. The apparatus, according to claim 1, wherein:
   said plate member having a slot therein extending along at least a portion thereof where the upwardly projecting portion thereof begins to rise upwardly.

7. The apparatus, according to claim 6, wherein:
   said slot is located at the front portion of said upwardly projecting portion.

8. The apparatus, according to claim 7, wherein:
   said slot extends approximately 180 degrees from one side of said upwardly projecting portion, around the front portion thereof to the other side thereof.

9. The apparatus, according to claim 1, further comprising:
   a V-shaped opening in the rear portion of said plate member for allowing said plate member to flex as the hoof of the horse grows whereby self adjustment of the plate member is realized and for allowing the frog portion of the foot of the horse to be exposed to normal ground pressure whereby stimulation of the frog promotes good blood circulation.

10. The apparatus, according to claim 1, wherein:
said support means is generally a U-shaped member.

11. The apparatus, according to claim 10, wherein:
said U-shaped member is constructed of a flexible rubber.

12. An apparatus for the treatment of laminitis in a horse, comprising:
a plate member sized, shaped and adapted for fastening to the hoof of a horse.
said plate member including an upwardly projecting portion positioned to rotate the out of position coffin bone of the horse into the normal position for healing,
said plate member having a slot therein extending along at least a portion thereof where the upwardly projecting portion thereof begins to rise upwardly, the length of said slot being great enough to allow upward movement of said upwardly projecting portion as a result of ground pressure exerted when the horse is standing.

13. The apparatus according, to claim 12, further comprising:
a support means, extending from the top of said upwardly projecting portion, for providing additional positioning and support of the coffin bone of the horse.

14. The apparatus, according to claim 13, further comprising:
a cushioning means, positioned on the top of said plate and said support means, for cushioning the bottom of the foot of the horse.

15. The apparatus, according to claim 14, wherein said support means is integral with a bonding means, said bonding means for fastening said cushioning means to said plate member.

16. The apparatus, according to claim 12, wherein:
said slot is located at the front portion of said upwardly projecting portion.

17. The apparatus, according to claim 16, wherein:
said slot extends approximately 180 degrees from one side of said upwardly projecting portion, around the front portion thereof to the other side thereof.

* * * * *